US011210468B2

United States Patent
Patel et al.

(10) Patent No.: US 11,210,468 B2
(45) Date of Patent: Dec. 28, 2021

(54) SYSTEM AND METHOD FOR COMPARING PLURALITY OF DOCUMENTS

(71) Applicant: Innoplexus AG, Eschborn (DE)

(72) Inventors: Sunil Patel, Di-Patan (IN); Tanay Gahlot, Goa (IN); Vatsal Agarwal, Rampur (IN)

(73) Assignee: Innoplexus AG, Eschborn (DE)

(*) Notice: Subject to any disclaimer, the term of this patent is extended or adjusted under 35 U.S.C. 154(b) by 434 days.

(21) Appl. No.: 16/145,828

(22) Filed: Sep. 28, 2018

(65) Prior Publication Data

US 2020/0104359 A1 Apr. 2, 2020

(51) Int. Cl.
*G06F 16/00* (2019.01)
*G06F 40/284* (2020.01)
*G06K 9/62* (2006.01)
*G06N 20/00* (2019.01)
*G06F 16/31* (2019.01)

(52) U.S. Cl.
CPC .......... *G06F 40/284* (2020.01); *G06F 16/313* (2019.01); *G06K 9/6215* (2013.01); *G06K 9/6256* (2013.01); *G06N 20/00* (2019.01)

(58) Field of Classification Search
CPC .... G06F 16/367; G06F 16/313; G06F 40/284; G06N 20/00; G06K 9/6215; G06K 9/6256
See application file for complete search history.

(56) References Cited

U.S. PATENT DOCUMENTS

| | | | | |
|---|---|---|---|---|
| 7,536,408 | B2* | 5/2009 | Patterson | G06F 16/313 |
| 2004/0205448 | A1* | 10/2004 | Grefenstette | G06F 16/9535 |
| | | | | 715/230 |
| 2011/0218947 | A1* | 9/2011 | Vadlamani | G06N 5/04 |
| | | | | 706/12 |

(Continued)

OTHER PUBLICATIONS

Nevzorova, Olga, Vladimir Nevzorov, and Alexander Kirillovich. "A syntactic method of extracting terms from special texts for replenishing domain ontologies." 2017 Second Russia and Pacific Conference on Computer Technology and Applications (RPC). IEEE, 2017.*

(Continued)

*Primary Examiner* — Nan Hutton
(74) *Attorney, Agent, or Firm* — Ziegler IP Law Group, LLC (57) ABSTRACT

Disclosed is a system for comparing a plurality of documents, wherein each of the plurality of documents comprise one or more sentences the system comprises a lexicon ontology represented into multi-dimensional hierarchical space communicably coupled with a server arrangement. The server arrangement is configured to obtain the documents, tokenize, using a tokenizer module, the sentences in each of the documents to obtain a plurality of tokens for each of the documents, determine token coordinates of each of the tokens in the multi-dimensional hierarchical space representing the lexicon ontology, determine sentence coordinates for each of the sentences in the documents using a transmutation module, generate similarity scores for each of the sentences in the documents using a comparison module, and determine a measure of similarity between the documents based on the similarity scores of the sentences in the documents.

20 Claims, 2 Drawing Sheets

(56) References Cited

U.S. PATENT DOCUMENTS

| | | | |
|---|---|---|---|
| 2013/0268534 A1* | 10/2013 | Mathew | G06F 40/40 |
| | | | 707/740 |
| 2015/0133330 A1* | 5/2015 | Olaru | C12N 15/111 |
| | | | 506/9 |
| 2016/0188568 A1* | 6/2016 | Srinivasan | G06F 40/30 |
| | | | 704/9 |
| 2019/0188586 A1* | 6/2019 | Rajabizadeh | G06N 3/08 |
| 2019/0311399 A1* | 10/2019 | Liu | G06Q 30/0244 |

OTHER PUBLICATIONS

Maedche, Alexander, and Steffen Staab. "Ontology learning." Handbook on ontologies. Springer, Berlin, Heidelberg, 2004. 173-190.*

Pawar, Atish, and Vijay Mago. "Calculating the similarity between words and sentences using a lexical database and corpus statistics." arXiv preprint arXiv: 1802.05667 (2018).*

* cited by examiner

SYSTEM AND METHOD FOR COMPARING PLURALITY OF DOCUMENTS

TECHNICAL FIELD

The present disclosure relates generally to data processing system, and more specifically, to systems for comparing a plurality of documents. Moreover, the present disclosure relates to methods of comparing a plurality of documents.

BACKGROUND

With advancement in digital technology, majority of information is shared in form of digital data or digital content stored in documents. Typically, documents comprise textual or graphical information, including its structure and format, e.g. fonts, colors, and images relating to a subject under examination. Moreover, such documents may be published and/or stored on various sources (namely, public sources and/or private sources) for increased accessibility and to provide a concrete record.

However, an exponential increase in the number of documents published and/or stored in different forms, pertaining to a single subject, has muddled the process of extracting relevant information from the documents. Generally, relevant information relating to a subject is accessed by searching a plurality of documents stored and/or published on the various sources. However, several documents from amongst the plurality of documents stored and/or published on the various sources may have similar context and/or identical content. Furthermore, a plurality of copies of a singular document (namely, duplicates) may be stored and/or published on the various sources. Consequently, extracting the relevant information from such plurality of documents becomes tiresome and time-consuming, owing to redundant and analogous documents.

Furthermore, such problem relating to redundant and analogous documents available on the various sources is addressed by document comparison technique employing document comparators. Typically, document comparators are employed to compare the plurality of documents, so as to remove the redundant and analogous documents. The document comparator compares content pertaining to each of the plurality of documents to be compared, thereby identifying any deviation in the compared documents. Furthermore, in an example, a document comparator may highlight identified dissimilarities in the content of the documents compared. Specifically, the document comparators analyze content of each of the plurality of document to remove or identify documents having identical content or duplicates of a single document.

However, the conventional document comparators identify dissimilarities in the content of the plurality of documents along with insubstantial deviations such as whitespace differences, automated changes, interchangeable words, punctuations, and so forth. Moreover, such document comparators also identify deviations in elemental features that are predominantly used for styling the document such as font, highlight, style, and so forth as dissimilarities amongst the plurality of documents compared.

However, such insubstantial dissimilarities do not change a context pertaining to the document. Moreover, such insubstantial identified dissimilarities augment the difficulty in extracting relevant information from the plurality of documents. Additionally, the insubstantial identified dissimilarities reduce the effectiveness of the resultant documents obtained relating to the subject, from searching the various sources. Consequently, such document comparators fail to reduce the redundant and analogous documents.

Therefore, in the light of foregoing discussion, there exists a need to overcome the aforementioned drawbacks associated with conventional methods of comparing documents for extracting desirable information.

SUMMARY

The present disclosure seeks to provide a system for comparing a plurality of documents. The present disclosure also seeks to provide a method of comparing a plurality of documents. The present disclosure seeks to provide a solution to the existing problem of word-to-word mapping of the documents for comparison thereof. An aim of the present disclosure is to provide a solution that overcomes at least partially the problems encountered in prior art, and provides a platform for executing context-based mapping of the plurality of documents, thereby enhancing runtime and computational efficiency.

In one aspect, an embodiment of the present disclosure provides a system for comparing a plurality of documents, wherein each of the plurality of documents comprise one or more sentences, wherein the system comprises:
  a lexicon ontology represented into a multi-dimensional hierarchical space; and
  a server arrangement communicably coupled to the lexicon ontology, wherein the server arrangement is configured to:
    obtain the plurality of documents,
    tokenize, using a tokenizer module, the one or more sentences in each of the plurality of documents to obtain a plurality of tokens for each of the plurality of documents,
    determine token coordinates of each of the plurality of tokens in the multi-dimensional hierarchical space representing the lexicon ontology;
    determine sentence coordinates for each of the one or more sentences in the plurality of documents using a transmutation module, wherein sentence coordinates for a given sentence is determined based on token coordinates of tokens in the given sentence and token coordinates of tokens neighboring to the given sentence;
    generate similarity scores for each of the one or more sentences in the plurality of documents using a comparison module, wherein sentence coordinates of a given sentence in a document (in the plurality of documents) is compared with sentence coordinates of one or more sentences of the remaining documents (in the plurality of documents) to generate similarity scores for the given sentence; and
  determine a measure of similarity between the plurality of documents based on the similarity scores of the one or more sentences in the plurality of documents.

In another aspect, an embodiment of the present disclosure provides a method of comparing a plurality of documents, wherein each of the plurality of documents comprise one or more sentences, wherein the method is implemented via a system comprising a server arrangement communicably coupled to a lexicon ontology, the method comprising:
  obtaining the plurality of documents;
  tokenizing, using a tokenizer module, the one or more sentences in each of the plurality of documents to obtain a plurality of tokens for each of the plurality of documents;

determining token coordinates of each of the plurality of tokens in the multi-dimensional hierarchical space representing the lexicon ontology;

determining sentence coordinates for each of the one or more sentences in the plurality of documents using a transmutation module, wherein sentence coordinates for a given sentence is determined based on token coordinates of tokens in the given sentence and token coordinates of tokens adjacent to the given sentence;

generating similarity scores for each of the one or more sentences in the plurality of documents using a comparison module, wherein sentence coordinates of a given sentence in a document (in the plurality of documents) is compared with sentence coordinates of one or more sentences of the remaining documents (in the plurality of documents) to generate similarity scores for the given sentence; and determining a measure of similarity between the plurality of documents based on the similarity scores of the one or more sentences in the plurality of documents.

Embodiments of the present disclosure substantially eliminate or at least partially address the aforementioned problems in the prior art, and enable contextual comparison of the plurality of documents in an efficient manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they may be implemented. Although some modes of carrying out the present disclosure have been disclosed, those skilled in the art would recognize that other embodiments for carrying out or practicing the present disclosure are also possible.

In one aspect, an embodiment of the present disclosure provides a system for comparing a plurality of documents, wherein each of the plurality of documents comprise one or more sentences, wherein the system comprises:
  a lexicon ontology represented into a multi-dimensional hierarchical space; and
  a server arrangement communicably coupled to the lexicon ontology, wherein the server arrangement is configured to:
    obtain the plurality of documents,
    tokenize, using a tokenizer module, the one or more sentences in each of the plurality of documents to obtain a plurality of tokens for each of the plurality of documents,
    determine token coordinates of each of the plurality of tokens in the multi-dimensional hierarchical space representing the lexicon ontology;
    determine sentence coordinates for each of the one or more sentences in the plurality of documents using a transmutation module, wherein sentence coordinates for a given sentence is determined based on token coordinates of tokens in the given sentence and token coordinates of tokens neighboring to the given sentence;
    generate similarity scores for each of the one or more sentences in the plurality of documents using a comparison module, wherein sentence coordinates of a given sentence in a document (in the plurality of documents) is compared with sentence coordinates of one or more sentences of the remaining documents (in the plurality of documents) to generate similarity scores for the given sentence; and
    determine a measure of similarity between the plurality of documents based on the similarity scores of the one or more sentences in the plurality of documents.

In another aspect, an embodiment of the present disclosure provides a method of comparing a plurality of documents, wherein each of the plurality of documents comprise one or more sentences, wherein the method is implemented via a system comprising a server arrangement communicably coupled to a lexicon ontology, the method comprising:
  obtaining the plurality of documents;
  tokenizing, using a tokenizer module, the one or more sentences in each of the plurality of documents to obtain a plurality of tokens for each of the plurality of documents;
  determining token coordinates of each of the plurality of tokens in the multi-dimensional hierarchical space representing the lexicon ontology;
  determining sentence coordinates for each of the one or more sentences in the plurality of documents using a transmutation module, wherein sentence coordinates for a given sentence is determined based on token coordinates of tokens in the given sentence and token coordinates of tokens adjacent to the given sentence;
  generating similarity scores for each of the one or more sentences in the plurality of documents using a comparison module, wherein sentence coordinates of a given sentence in a document (in the plurality of documents) is compared with sentence coordinates of one or more sentences of the remaining documents (in the plurality of documents) to generate similarity scores for the given sentence; and determining a measure of similarity between the plurality of documents based on the similarity scores of the one or more sentences in the plurality of documents.

The aforesaid system for comparing the plurality of documents and the aforesaid method of comparing the plurality of documents provides a platform to compare the plurality of documents. The system and method disclosed herein enables a user to identify deviations amongst the plurality of documents compared, thereby enabling efficient extraction of relevant information. Beneficially, the system identifies dissimilarities in the plurality of documents to be compared by analyzing a context pertaining to content of the plurality of documents and further comparing thereto. Moreover, analyzing the context pertaining to the content of the document to be compared, enables the system to overlook the insubstantial dissimilarities such as whitespace differences, font differences, format differences, structure differences, interchangeable words, and so forth.

Beneficially, the system described herein does no merely highlights the dissimilarities between the compared documents but analyzes the plurality of documents to identify substantial dissimilarities pertaining to the context of the content of the plurality of documents. Moreover, the system employs deep machine learning algorithms for training of the system, thereby reducing training time and complexity for training the system in real-time.

Additionally, the system employs machine learning algorithms to determine a similarity score pertaining to the documents. Beneficially, the machine learning algorithms improves output of the system (namely, accuracy of similarity score) by significantly improving the quality of the data samples generated, pertaining to the analyzed context of the plurality of documents. Moreover, the system described herein adapts to the feedback provided by a user of the system thereby making the system more active and user-friendly.

It will be appreciated that the system for comparing the plurality of documents proffers a platform to achieve a technical effect of enabling comparison of the plurality of documents by context-based mapping thereof. Moreover, the aforesaid system addresses real life hinderance owing to redundant and analogous documents obtained as search results from plurality of sources so as to achieve the above mentioned technical effect. Additionally, the system enhances the operational characteristics of a computer. Typically, the system for comparing the plurality of documents performs activities such as tokenization of the one or more sentences in the plurality of documents, determination of token coordinates, determination of sentence coordinates, analysis of sentence coordinates, and interpretation of the analysis on the server arrangement of the system. Consequently, the performance of the computer is optimized owing to substantial decrease in the computational power utilized by the system. Additionally, the system employs unique methodology to achieve the technical effect stated above, by training the system using machine learning algorithms. It will be appreciated that the system addresses a crucial drawback associated with the digital comparators and the use thereof by providing the aforesaid platform for overcoming the word-to-word mapping of documents for comparison thereof.

Furthermore, the use of the machine learning algorithms to train the system provides greater efficiency, enhanced runtime, and efficient utilization of resources and computational power. Moreover, the machine learning algorithms are trained using unsupervised learning techniques and semi-supervised learning techniques, so as to train the system efficiently, without employing large labeled training datasets and with optimal computational power.

It will be appreciated that the aforesaid system and the aforesaid method are not limited to execute document comparison for only a definite number of documents (such as two documents). The system and method is employed to execute document comparison for multiple documents stored in a given database at a given time. Moreover, the system and method is be employed to execute document comparison for multiple documents stored at various locations in a single database or in a plurality of databases. The database may comprise documents obtained from one or more locations or documents provided by one or more users, wherein the user is a person or a bot that operates the aforesaid system.

Throughout the present disclosure, the term "plurality of documents" refers to a set of files in which information is recorded, wherein the information is recorded as a data type. Some examples of various data types are text data, tabular data, image data, and so forth. Thus, documents may be in any suitable file formats depending upon the data type in which the information is recorded. Moreover, the plurality of documents further comprises associated attributes that relate to visual appearance thereof. In an example, the associated attribute may include a structure relating to the plurality of documents such as a layout of the document, a design of the document, and so forth. In another example, the associated attributes may include a format relating to the plurality of documents such as font, color, and image, and so forth. Optionally, each of the plurality of documents adheres to a subject area or a domain associated therewith. More optionally, each of the plurality of documents may be saved as a uniquely named file in one or more databases.

Furthermore, each of the plurality of documents comprise one or more sentences. Typically, the "one or more sentences" comprised in each of the plurality of documents refers to a basic unit of language that expresses a complete idea. The idea expressed by the one or more sentences relates to the subject area or the domain associated with the document. In other words, the one or more sentences contained in a given documents conveys a brief description relating to the subject area or the domain associated with the given document. Additionally, the one or more sentences follows grammatical rules and syntaxes for formation thereof.

The system comprises the lexicon ontology represented into the multi-dimensional hierarchical space. It will be appreciated that a given domain comprises a set words relating to concepts, categories, and so forth of the given domain. Typically, an ontology defines properties associated with the set of words and relations therebetween in the given domain. Throughout the present disclosure, the term "lexicon ontology" refers to a databank that defines knowledge pertaining to the utilization of the set of words based on the properties and the relations, in the given domain. In other words, lexicon ontology refers to a databank comprising semantic relations between the set of words relating to concepts, categories, and so forth in the given domain, wherein the semantic relations define at least one of: properties, relations, and utilization associated with the set of words.

Optionally, the lexicon ontology may be a general databank comprising semantic relations between set of words comprised in one or more languages such as English, German, French, and so forth. More optionally, the lexicon ontology may be a domain specific databank comprising semantic relations associated with the set of words comprised in a specific domain, in a specified language. In an example, the lexical ontology may be a data bank comprising semantic relations associated with set of words associated with biomedical, in English language.

Optionally, the set of words comprised in the lexicon ontology databank are content words. Typically, 'content words' refer to words that describes objects of actuality and qualities associated therewith. Such as, for example, the content words consist of at least one of: nouns, lexical verbs, adjectives, and adverbs. More optionally, the lexicon ontology databank may include multi-word expressions such as idiomatic expressions, phrasal verbs, jargon expressions, and other common expressions.

Furthermore, optionally, each word from amongst the set of words in the lexicon ontology databank is described as a lexical entry. The description of each of the words in the lexical entry is determined by a function or a purpose of creation of the lexicon ontology. Specifically, the description of a word from amongst the set of words in the lexicon ontology as the lexical entry may include at least one of: a property pertaining to spelling or sound of the word, grammatical behavior of the word, meaning of the word, use of the word, and nature of semantic relations of the words with other words in the lexicon ontology. Therefore, it will be appreciated that the lexical entry of each of the words in the lexicon ontology comprise records relating to linguistic behavior of each of the words and meaning associated therewith.

More optionally, the lexicon ontology is referred as a data bank wherein a semantic relation between each of the words from amongst the set of words is mapped to information relating therewith. It will be appreciated that words having more than one (namely, multiple) syntactics have separate lexical entries associated with each of the syntactics related therewith. For example, a word 'flex' will have a first lexical entry as a noun referring to 'an insulating material' and a second lexical entry as a verb referring to 'an act of flexing'. Moreover, a single word may have separate lexical entries associated therewith, owing to homonym or polysemy nature of the word.

It will be appreciated that a word may have a plurality of morphological variants, such as a plurality of nouns, plurality of inflected forms, and so forth. In such case, the word may not have separate lexical entries pertaining to the plurality of morphological variants. Alternately, the lexical entry associated with base form of the word may consists of additional number of pointers pointing towards the plurality of morphological variants. In an example, a lexical entry pertaining to 'gives', 'giving', 'gave', and 'given' is understood to be inflected forms for the base form of verb 'give'. Therefore, the lexical entry pertaining to the inflected forms of the verb will point to the base form of the verb. Additionally, optionally, the base form of the word may further point towards the inflected forms of the word.

The lexicon ontology is represented into the multi-dimensional hierarchical space. In other words, the set of words comprised in the lexicon ontology is embedded in the multi-dimensional hierarchical space. Throughout the present disclosure, the term "multi-dimensional hierarchical space" refers to an embedding space, wherein semantic relations (in form of, paths) are established between a plurality of words. Pursuant to embodiments of the present disclosure, the multi-dimensional hierarchical space embeds the set of words comprised in the lexicon ontology such that meaning of each of the words, in the set of words, is derived from a characteristic of embedding of the word in the multi-dimensional hierarchical space.

It will be appreciated that the set of words embedded in the multi-dimensional hierarchical space have semantic relations with one another. Furthermore, optionally, the multi-dimensional hierarchical space is represented as a tree structure. Pursuant to embodiments of the present disclosure, the term 'node' refers to a word from amongst the set of words in the lexicon ontology, wherein the lexicon ontology is represented as the tree structure (namely, a node-link structure). Typically, in the tree structure, a node includes a pointer (namely, address) to a parent node. It will be appreciated that the node may or may not have a child node. Consequently, the node may or may not include a pointer to the child node. Moreover, the node may have 0, 1, 2, 3, and so on, number of child node associated therewith. The multi-dimensional hierarchical space uses the tree structure to establish sematic relations between the set of words, in the lexicon ontology. Typically, the tree structure is instigated by a root node (namely, the starting point of the tree), wherein the root node is the highest-level node. The tree structure is terminated by leaf nodes (namely, the ending point of the tree), wherein the leaf nodes are the bottom-level nodes.

It will be appreciated that the tree structure is a general class of node-link structure. Furthermore, the system and method described in the present disclosure may be implemented so as to support alternative node-link structures.

Typically, embedding of the set of words in the multi-dimensional hierarchical space, organizes (namely, sorts) the set of words such that the multi-dimensional hierarchical space reflects semantic and functional relations (such as, similarity) amongst the set of words in the lexicon ontology. Optionally, a distance between a word from remainder of words (or, a length of a path between a word from remainder of words), in the lexicon ontology, may define semantic relation of the word with the remainder of the words. The semantic relations further reflect homophily properties associated with each of the words, in the set of words, found in real-world networks.

Optionally, the multi-dimensional hierarchical space is a hyperbolic space. Specifically, the hyperbolic space represents the lexicon ontology by way of a hyperbolic geometry structure that may be modeled in two-dimensions. In an example, the hyperbolic geometry structure models the leaf nodes at exactly '/' level, below the root node, in a sphere space with a radius 'r', wherein the radius 'r' is proportional to '/'. The nodes that are less than '/' level below the root node are placed within the sphere in the hyperbolic space. It will be appreciated that the hyperbolic space will grow exponentially with the radius of the sphere. Beneficially, the hyperbolic spaces embed complex hierarchies having increased number of nodes in reduced dimensionality. Consequently, the hyperbolic space requires minimal computational power and resource to determine a semantic relation of a word with the remainder of words comprised in the lexicon ontology, without a loss of information. Furthermore, the hyperbolic space operates at reduced runtime and memory complexity. A person skilled in the art will appreciate that the hyperbolic space may be implemented by way of a plurality of models such as Beltrami-Klein model, hyperboloid model, Poincaré half-plane model, and so forth.

More optionally, the hyperbolic space may be represented in form of a Poincaré half-plane model. In such case, words from the set of words (represented as nodes) are represented by way of a Poincaré ball, wherein the distance within the Poincare ball changes with respect to the distance of the nodes in the hyperbolic space. The Poincaré half-plane model depicts the hierarchical space in form of continuous embeddings, based on a relation between distance of nodes within the Poincaré ball and the distance of the nodes in the hyperbolic space. In an example, a root node of a tree structure may be placed at an origin of a Poincaré ball in a Poincaré half-plane model. In such case, leaf nodes of the tree structure may be placed close to the boundary of the Poincaré ball in a Poincaré half-plane model. Furthermore, the nodes between the root node and the leaf nodes may be represented in the Poincaré ball, enclosed within.

The system comprises the server arrangement communicably coupled to the lexicon ontology. Throughout the present disclosure, the term "server arrangement" refers to an arrangement of one or more servers that includes one or more processors configured to perform various operations, for example, as mentioned earlier. Optionally, the server arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the server arrangement is implemented by way of a single hardware server. The server arrangement may alternatively be implemented by way of a plurality of hardware servers operating in a parallel or distributed architecture. As an example, the server arrangement may include components such as memory, a processor, a network adapter and the like, to store and process information pertaining to the document and to communicate the processed information to other computing components, for example, such as a client device.

In an embodiment, the lexicon ontology databank is stored at a database arrangement associated with the server arrangement. Optionally, the database arrangement comprises one or more databases. Throughout the present disclosure, the term "database arrangement" as used herein refers to an organized body of digital information, regardless of the manner in which the data or the organized body thereof is represented. Optionally, the database may be hardware, software, firmware and/or any combination thereof. For example, the organized body of related data may be in the form of a table, a map, a grid, a packet, a datagram, a file, a document, a list or in any other form. The database includes any data storage software and systems, such as, for example, a relational database like IBM DB2 and Oracle 9.

The server arrangement is configured to obtain the plurality of documents. Optionally, the system for comparing the plurality of documents provides a graphical user interface to a user, wherein the user provides the plurality of documents for comparison thereof. The user may be any entity including a person (i.e., human being) or a virtual personal assistant (an autonomous program or a bot) using the system and method described herein. However, optionally, the server arrangement may obtain the plurality of documents for comparison from a plurality of sources. It will be appreciated that the user may directly upload the plurality of documents to be compared or provide a location pertaining to each of the plurality of documents to be compared.

Optionally, the server arrangement may display, on the graphical user interface, a list associated with the plurality of documents uploaded by the user. Furthermore, optionally, the server arrangement may provide one or more user selectable buttons to the user so as to enable the user to select the plurality of documents from amongst a corpus of documents, wherein the corpus of documents may consist of random collection of documents. Additionally, optionally, the server arrangement may enable the user to provide one or more locations wherein the plurality of documents may be stored. In an example, the one or more locations associated with the plurality of documents, to be provided by the user, may be a plurality of URLs referencing to World Wide Web. Moreover, the plurality of documents received from the one or more locations may be stored (such as, locally or in a database) and/or displayed in form of a list on the graphical user interface.

More optionally, the server arrangement may operate automatically, so as to receive the plurality of documents from the one or more locations provided by the user. Furthermore, receiving the plurality of documents from the one or more locations may include at least one of: extracting document(s) from the one or more locations, decompressing document(s) from the one or more locations, copying document(s) from the one or more locations to an appropriate location, and setting registry information pertaining to document(s) at the one or more locations.

The server arrangement is configured to tokenize, using the tokenizer module, the one or more sentences in each of the plurality of documents to obtain the plurality of tokens for each of the plurality of documents. Typically, the term "tokenize" refers to a process of breaking a sequence of strings into smaller entities. Additionally, the entities defined may be words, keywords, phrases, symbols, and so forth. The process of tokenization is performed by a tokenizer module, wherein the tokenizer module operates to classify entities of a sequence of strings. Pursuant to embodiments of the present disclosure, a document (namely, input data) from amongst the plurality of documents is classified into a set of one or more sentences (namely, a sequence of strings). Furthermore, the set of one or more sentences is tokenized into a set of plurality of tokens (namely, entities). Similarly, each of the document in the plurality of documents to be compared is tokenized into a corresponding set of plurality of tokens.

Optionally, the tokenizing module identifies tokens based on at least one of: rules pertaining to lexeme, regular expressions, specific sequence of characters of one or more words, specific and separating characters (such as, punctuations, white spaces, and so forth). More optionally, tokens may be made of alphabetic characters, alpha-numeric characters, or numeric characters. In an embodiment, the tokenizing module analyzes a punctuation character (such as, a period '.') and white space so as to define tokens. In such case, the punctuation character (namely, the period '.') may denote an abbreviation, a decimal point, an ellipsis, an email-address, or an end of a sentence. In an example, for a sentence, 'Mr. Smith is my neighbor.', the tokenizer module may define the tokens to be 'Mr. Smith', 'is', 'my', 'neighbor', '.'.

Furthermore, it will be appreciated that the "plurality of tokens" identified by the tokenizer module refers to entities such as individual words, keywords, phrases, and so forth. Typically, obtaining the plurality of tokens for each of the plurality of documents relies upon heuristic procedures. Moreover, in an example, the characters may be placed together with arithmetic operator, without white spaces, such that it appears as a single word. In such case, the arithmetic operator may be considered as a token. Furthermore, the arithmetic operator may be considered as a separator (such as, a white space).

The server arrangement is configured to determine token coordinates of each of the plurality of tokens in the multi-dimensional hierarchical space representing the lexicon ontology. Typically, the token coordinates refer to a location of an entity (namely, a token) in the multi-dimensional hierarchical space, wherein the location is specified by a set of numbers, letters, symbols, or a combination thereof. It will be appreciated that each word from amongst the set of words in the lexicon ontology databank represented into the multi-dimensional hierarchical space have a defined location. Pursuant to embodiments of the present disclosure, the server arrangement determines location (namely, coordinate) pertaining to each of the token from amongst the plurality of tokens for each of the plurality of documents to be compared.

In an example, a token from amongst the plurality of tokens may be 'oligodendrocytes'. In such case, a location of the token in the multi-dimensional hierarchical space (namely, the token coordinate) may be defined by a set of numbers in Euclidean cartesian coordinate form such as [−0.22, 0.22, 0.221, 0.3443]. In another example, a location of the token in the multi-dimensional hierarchical space may be defined by a combination of numbers and characters in a vector form such as (−0.22x+0.22iy).

The server arrangement is configured to determine sentence coordinates for each of the one or more sentences in the plurality of documents using the transmutation module, wherein sentence coordinates for the given sentence is determined based on token coordinates of tokens in the given sentence and token coordinates of tokens neighboring to the given sentence. The term "sentence coordinate" refers to a location of a sentence from amongst the one or more sentences comprised in a document. Specifically, the sentence coordinates define a location of the given sentence by way of a set of numbers, letters, symbols, or a combination thereof in the multi-dimensional hierarchical space. Furthermore, the server arrangement employs the transmutation module to obtain the sentence coordinate by analyzing the token coordinates relating to the given sentence. Additionally, the token coordinates of sentences neighboring to the given sentence are also analyzed, so as to obtain the sentence coordinate for the given sentence.

Throughout the present disclosure, the term "machine learning algorithms" refer to a category of algorithms employed by a software application. The machine learning algorithms allows the software applications to become more accurate in predicting outcomes and/or performing tasks, without being explicitly programmed. Typically, the software application is a set of instructions executable by a computer or other digital system so as to configure the computer or the digital system to perform a task. Specifically, the machine learning algorithms are employed to artificially train the software applications so as to enable them to automatically learn, from analyzing training dataset and improving performance from experience, without being explicitly programmed.

Optionally, the software application, employing the machine learning algorithms, is trained using a training dataset. More optionally, the software application may be trained using different types of machine learning algorithms, depending upon the training dataset employed. Typically, examples of the different types of machine learning algorithms, depending upon the training dataset employed for training the software application comprise, but are not limited to: supervised machine learning algorithms, unsupervised machine learning algorithms, semi-supervised learning algorithms, and reinforcement machine learning algorithms. Furthermore, the software application is trained by interpreting patterns in the training dataset and adjusting the machine learning algorithms accordingly to get a desired output.

Optionally, the transmutation module employs machine learning algorithms. The machine learning algorithms enable the transmutation module to analyze a training dataset and further adapt thereto, so as to predict desired output. Pursuant to embodiments of the present disclosure, the transmutation module employs the machine learning algorithms so as to automatically train itself to generate the sentence coordinates for each of the one or more sentences.

Furthermore, the machine learning algorithms are trained to determine sentence coordinates for each of the one or more sentences in the plurality of documents based on the token coordinates of tokens in the given sentence and the token coordinates of tokens neighboring to the given sentence. Optionally, the machine learning algorithms are further trained to identify a correlation (such as, a semantic relation) between the given sentence and sentences neighboring to the given sentence.

The term "unsupervised learning techniques" refers to a learning technique employed by the machine learning algorithms to train the software applications using unlabeled training dataset or unstructured training information. Specifically, the unsupervised learning techniques employ unsupervised machine learning algorithms that are not trained with a desired output. Alternately, the unsupervised machine learning algorithms analyze the unlabeled training dataset provided for training and further interpret the training dataset so as to sort the training data without using predefined labels.

Optionally, the transmutation module, employing machine learning algorithms, is trained using unsupervised learning techniques. In accordance with an embodiment of the present invention, the unsupervised machine learning algorithms are employed to train the transmutation module by way of unlabeled training dataset. The transmutation modules is trained to perform complex analysis onto the token coordinates of the given sentence so as to determine the sentence coordinate for the given sentence. Beneficially, the unsupervised learning techniques employ unlabeled training dataset thereby saving time required for labelling the dataset.

In an embodiment, the transmutation module may compute a resultant coordinate from the token coordinates of tokens in the given sentence so as to determine the sentence coordinate for the given sentence. In an example, the resultant coordinate may be a mean of the token coordinates of tokens in the given sentence in Euclidean cartesian form. In another example, the resultant coordinate of the token may be a cosine product (namely, dot product) of the token coordinates of tokens in the given sentence in vector form.

Optionally, unsupervised learning techniques operate by combining substantially large examples of training datasets to train the unsupervised machine learning algorithms. Moreover, the unsupervised machine learning algorithms enable the transmutation module to identify correlations between each of the one or more sentences in a given document. More optionally, the unsupervised machine learning algorithms may create a data bank so as to store an interpretation or analysis relating to the training dataset provided for training the machine learning algorithms. Furthermore, the unsupervised machine learning algorithms may refer the data bank to interpret an input data or a new training dataset.

Furthermore, optionally, examples for unsupervised machine learning algorithms employed for unsupervised learning of an inherent structure relating to the training dataset, without using explicitly-provided labels are, but not limited to: k-means clustering, k-NN, Dimensionality Reduction, Singular Value Decomposition, Distribution models, Hierarchical clustering, Mixture models, Principal Component Analysis, and autoencoders.

In an embodiment, the transmutation module employs an encoder decoder architecture to determine the sentence coordinates for each of the one or more sentences in the plurality of documents. It will be appreciated that the encoder decoder architecture consists mainly of two parts, namely, an encoder and a decoder. Furthermore, a given sentence in a training dataset is a sequence of tokens, wherein each token has an associated token coordinate. The encoder decoder architecture takes the sequence of token coordinates comprising the given sentence and learns to produce another sequence of token coordinates that is substantially similar to the sequence of token coordinates comprising the given sentence. Subsequently, the encoder decoder architecture analyzes the semantic and syntactic structure of the given sentence thereby enhancing the output data.

In an encoder decoder architecture, the encoder is operable to analyze token coordinates of the sequence of tokens comprising the given sentence to determine sentence coordinate of the given sentence. Moreover, the encoder analyzes the token coordinates of tokens neighboring to the given sentence to obtain a sentence coordinate representation for the given sentence. Furthermore, the decoder analyzes the sentence coordinate representation of the token coordinates of the tokens in the given sentence so as to recreate the token coordinates therefrom. Specifically, the decoder tries to learn from the sentence coordinate representation of the token coordinates in the multi-dimensional hierarchical space, with minimum recreation error.

Furthermore, optionally, upon the training of the encoder decoder architecture on a training dataset, the decoder is excluded from the architecture. In other words, after training the unsupervised machine learning algorithms using the unlabeled training dataset, the decoder is removed thereby leaving encoder for further training of the unsupervised machine learning algorithms.

Optionally, the unlabeled training dataset for the transmutation module comprises a first set of existing publications. Typically, unlabeled training dataset do not have a desired output and no means for guidance (such as, feedback) is provided to the machine learning algorithms. Furthermore, examples of the first set of existing publications may comprise, but are not limited to: novels, research papers, newsletters, journals, bulletins, factsheets, reports, summaries, portable guides, and a combination thereof.

The server arrangement is configured to generate similarity scores for each of the one or more sentences in the plurality of documents using a comparison module, wherein the sentence coordinate of the given sentence in the document (in the plurality of documents) is compared with sentence coordinates of one or more sentences of the remaining documents (in the plurality of documents) to generate similarity scores for the given sentence. Specifically, the comparison module compares the sentence coordinate of the given sentence in the document with sentence coordinates of one or more sentences comprising the remainder of the plurality of documents, to generate a corresponding similarity score. Consequently, the comparison module further compares sentence coordinates relating to each of the one or more sentences in the document with sentence coordinates relating to one or more sentences in each of the remaining documents from amongst the plurality of documents, so as to generate a corresponding similarity score.

Throughout the present disclosure, the term "similarity score" refers to a numerical value or a point obtained upon relative comparison of a first sentence coordinate with a second sentence coordinate. Furthermore, in an embodiment, the similarity score is generated upon determining a distance between the first sentence coordinate with the second sentence coordinate, in the multi-dimensional hierarchical space. Pursuant to embodiments of the present disclosure, the first sentence coordinate belongs to the given sentence in the document (in the plurality of document). Conversely, the second sentence coordinate belongs to the one or more sentences in the remaining documents (in the plurality of documents). In an example, the similarity score may be defined between '0' and '1'.

Optionally, the comparison module employs machine learning algorithms. Specifically, the machine learning algorithms refer to a category of algorithms employed by the comparison module that allows the comparison module to become more accurate in determining the similarity score, without being explicitly programmed. It will be appreciated that the machine learning algorithms employed by the comparison module is trained using a training dataset. More specifically, the machine learning algorithms analyze the training dataset and further adapt thereto, so as to determine similarity score for an input data.

More optionally, the comparison module, employing the machine learning algorithms, is trained using semi-supervised learning techniques. The term "semi-supervised learning techniques" refers to a learning technique employed by the machine learning algorithms to train the software application using a labeled training dataset as well as an unlabeled training dataset. Specifically, the labeled training dataset comprises a small corpus of labeled data for supervised learning of the comparison module. Furthermore, the unlabeled training dataset comprises a comparatively large amount of unlabeled data for unsupervised learning of the comparison module. Beneficially, semi-supervised learning techniques significantly improves the quality of generated output and reduces training times for the machine learning algorithms.

It will be appreciated that the semi-supervised learning techniques comprises an initial supervised learning of the machine learning algorithms using labeled training dataset and eventual unsupervised learning of the machine learning algorithms using unlabeled training dataset. Notably, "supervised learning" refers to a learning technique employed by the machine learning algorithms, wherein the machine learning algorithms predict future outputs by learning from the labeled training datasets provided thereto.

The supervised machine learning algorithms analyze the labeled training dataset so as to interpret the labeled training dataset. Typically, the labeled training dataset comprises a desired output. Moreover, the labeled training dataset enables the machine learning algorithms to derive feedback pertaining to accuracy of output generated by the machine learning algorithms, during training. In other words, the supervised learning enables an instructor (such as, a human and/or a bot) to train the machine learning algorithms by providing labeled training dataset and further providing a feedback pertaining to the accuracy of the output generated by the machine learning algorithms.

Optionally, the supervised machine learning algorithms may compare output generated by the machine learning algorithms with desired output provided as feedback, by referencing the labeled training dataset. Moreover, upon finding any error, the machine learning algorithms modify thereto accordingly. Furthermore, upon the completion of supervised learning of the machine learning algorithms, the machine learning algorithms apply the interpretation derived from the labeled training dataset to unlabeled training dataset.

Optionally, the labeled training dataset for the comparison module comprises labeled publications relating to a first set of sentences as a similar training dataset and labelled publications relating a second set of sentences as a dissimilar training dataset. Specifically, the labeled training dataset for supervised learning of the machine learning algorithms comprises the first set of sentences and the second set of sentences. More specifically, the first set of sentences constitute the similar training dataset and the second set of sentences constitute the dissimilar training dataset.

Moreover, optionally, the labeled training dataset comprises a similarity score pertaining to the first set of sentences and the second set of sentences. In an embodiment, the similarity score for training the comparison module may have a defined range. In an example, the range defined for similarity score may be between '0' and '1'. In such case, the first set of sentences constituting the similar training dataset may have a similarity score near to '1'. Alternately, the second set of sentences constituting the dissimilar training dataset may have a similarity score near to '0'.

More optionally, the first set of sentences constituting the similar training dataset enables the comparison module to learn similar sentences. In other words, the similar training dataset comprises similar sentences so as to train the comparison module in regard to similar sentences. It will be appreciated that the first set of sentences will comprise sentences having identical content, synonyms, and/or similar context. In an example, the first set of sentences may comprise a pair of sentences such as, 'This report is confidential' and 'This is not to be disclosed' as the similar training dataset for training the comparison module. Moreover, the abovementioned sentences may have a similarity score '0.98'.

Alternately, the second set of sentences constituting the dissimilar training dataset enables the comparison module to learn dissimilar sentences. In other words, the dissimilar training dataset comprises unlike or different sentences so as to train the comparison module in regard to dissimilar sentences. It will be appreciated that the second set of sentences will comprise sentences having different content, and/or different context. In an example, the second set of sentences may comprise a pair of sentences such as, 'A cat is chased by a dog' and 'A dog is chased by a cat' as the dissimilar training dataset for training the comparison module. Moreover, the abovementioned sentences may have a similarity score '0.23'.

Optionally, the unlabeled training dataset for the comparison module comprises a second set of existing publications. As mentioned previously, the unlabeled training dataset is employed for eventual unsupervised learning of the machine learning algorithms. Typically, the unlabeled training dataset is neither classified nor labeled. Moreover, the unlabeled training dataset do not have a desired output and no means for guidance is provided to the machine learning algorithms. Furthermore, examples of the second set of existing publications may include, but are not limited to: novels, research papers, newsletters, journals, bulletins, factsheets, reports, summaries, portable guides, and a combination thereof.

Optionally, the comparison module is trained by employing a generator-adversarial network. Specifically, the generator-adversarial network is employed for unsupervised learning of the comparison module. Typically, the generator-adversarial network trains the comparison module using unsupervised machine learning algorithms to create random sentence coordinates similar and/or dissimilar to sentence coordinates relating to the training datasets (namely, labeled training dataset and unlabeled training dataset). Furthermore, the generator-adversarial network trains the machine learning algorithms of the comparison module to learn from the random sentence coordinates.

It will be appreciated that the generator-adversarial network is implemented by way of a generator neural network and a discriminator neural network. The generator neural network, employing generative algorithms, create new data instances. In other words, the generator neural network creates the random sentence coordinates by analyzing features relating to the training dataset. Furthermore, the discriminator neural network employing discriminative algorithms evaluate the new data instances. In other words, the discriminator neural networks analyze the random sentence coordinates so as to assign a similarity score to them. Specifically, the discriminator neural networks assign a number (namely, similarity score) between 0 and 1 to the random sentence coordinates generated by the generator neural network, with 1 representing a prediction of similarity and 0 representing dissimilarity. Moreover, optionally, the discriminator provides feedback to the generator pertaining to the evaluated similarity score. Consequently, the generator may generate more random sentence coordinates belonging a desired category (such as, similar to training dataset or dissimilar to training dataset).

The server arrangement is configured to determine the measure of similarity between the plurality of documents based on the similarity scores of the one or more sentences in the plurality of documents. Specifically, the server arrangement analyzes the similarity scores generated by comparing the sentence coordinate of the given sentence in the document with sentence coordinates of one or more sentences comprising the remaining plurality of documents. Similarly, the server arrangement analyzes similarity scores generated by comparing sentence coordinates relating to each of the one or more sentences in the plurality of documents with sentence coordinates relating to one or more sentences in each of the remaining documents from amongst the plurality of documents.

Notably, the server arrangement determines the measure of similarity so as to conclude a comparison result for the plurality of documents. The term "measure of similarity" refers to a determined conclusion depending on a threshold similarity score. In an embodiment, the similarity score may range between '0' and '1'. In such case, the threshold similarity score may be '0.5'. Consequently, the similarity scores above the threshold similarity score concludes the measure of similarity to be 'substantially similar'. Conversely, the similarity scores below the threshold similarity score concludes the measure of similarity to be 'substantially dissimilar'. Furthermore, in an example, a similarity score generated by comparing a first sentence coordinate of a first sentence in a first document with a second sentence coordinate of a second sentence in a second document in the plurality of documents may be '0.79'.

Subsequently, the server arrangement may interpret the generated similarity score to determine the measure of similarity to be 'substantially similar'. In another example, the similarity score generated by comparing a first sentence coordinate of a first sentence in a first document with a second sentence coordinate of a second sentence in a second document in the plurality of documents may be '0.32'. Subsequently, the server arrangement may interpret the generated similarity score to determine the measure of similarity to be 'not similar'.

It will be appreciated that the server arrangement determines the measure of similarity for each of the one or more sentences in a document in the plurality of documents by comparing associated sentence coordinate with sentence coordinates of each of the one or more sentences in remaining documents in the plurality of documents. Optionally, the server arrangement further determines a similarity score for a document by obtaining an average of similarity scores associated with one or more sentences in the document.

Optionally, the system is further configured to:

receive a user input relating to the similarity scores for each of the one or more sentences in the plurality of documents; and re-train the comparison module based upon the user input in case of misconception.

Specifically, the system for comparing a plurality of documents concludes a comparison result for each of the one or more sentences in the plurality of documents by analyzing similarity scores associated therewith. The system enables a user to provide user input relating to a comparison result concluded for each of the plurality of documents. Typically, in such case, the server arrangement analyses the user input so as to interpret it. Furthermore, upon realizing a difference between the concluded comparison result and the user input, the server arrangement re-trains the machine learning algorithm based upon the user input. In other words, in case of a discrepancy or deviation between the concluded comparison result and the user input, the server arrangement further trains the machine learning algorithms employed by the transmutation module and/or the comparison module.

For illustration purposes only, there will now be considered an example network environment, wherein a system for comparing a plurality of documents can be implemented, pursuant to embodiments of the present disclosure. One such network environment has been illustrated in conjunction with FIG. 1 as explained in more detail below.

Figure 1:
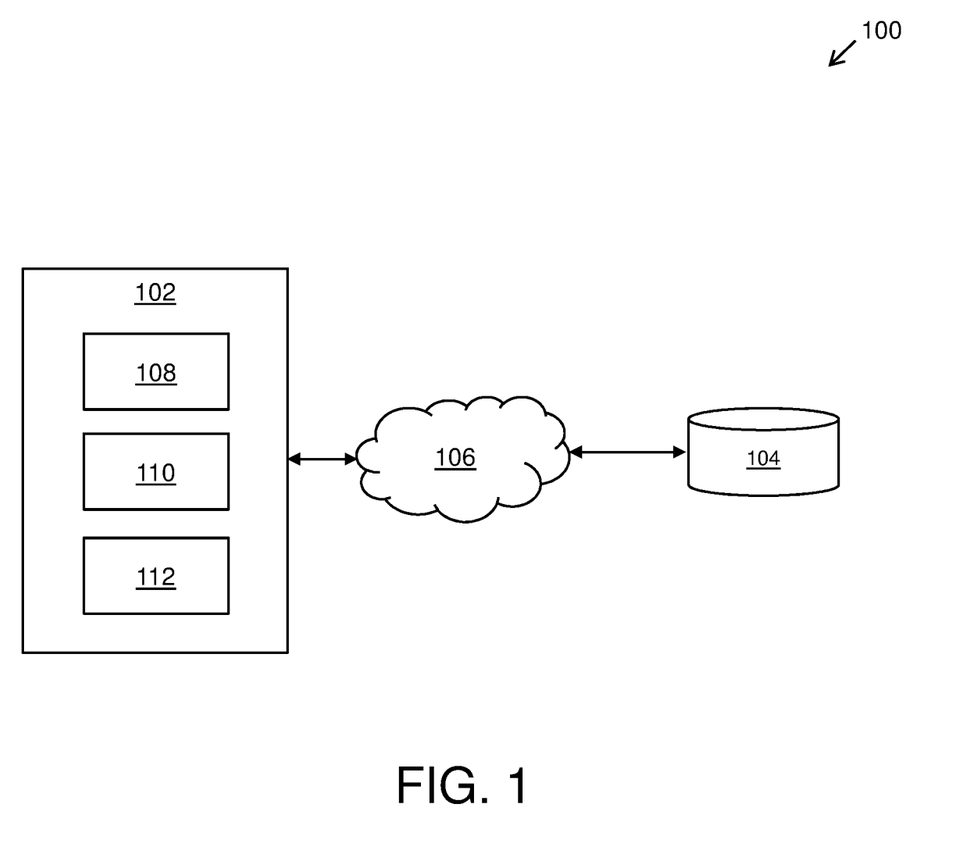
FIG. 1 is a schematic illustration of a network environment, wherein a system for comparing a plurality of documents is implemented, in accordance with an embodiment of the present disclosure.

The network environment includes a lexicon ontology of the system and a server arrangement of the system. The server arrangement, comprising one or more processors, is communicably coupled via the one or more data communication networks with the lexicon ontology of the system. Optionally, the network environment also includes a plurality of databases communicably coupled via the one or more data communication networks with the one or more processors of the server arrangement.

The one or more data communication networks can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

It will be appreciated that there may be a plurality of lexicon ontology pertaining to different domains. In an example, a lexicon ontology may relate to biomedical domain. In another example, a lexicon ontology may relate to energy domain. In yet another example, a lexicon ontology may relate to automobile domain.

It will be appreciated that it is not necessary for the one or more processors of the server arrangement to be coupled in communication with all of the lexicon ontology simultaneously at all times.

The one or more processors of the server arrangement are configured to execute machine readable instructions that cause the server arrangement to perform operations, for example, as illustrated with respect to the aforementioned aspect.

Moreover, the present description also relates to the method as described above. The various embodiments and variants disclosed above apply mutatis mutandis to the method.

Optionally, the method employs machine learning algorithms to train the transmutation module and the comparison module.

Optionally, the method employs training the transmutation module employing machine learning algorithms using unsupervised learning techniques.

Optionally, an unlabeled training dataset for the transmutation module comprises a first set of existing publications.

Optionally, the method employs training the comparison module employing machine learning algorithms using semi-supervised learning techniques.

Optionally, a labeled training dataset for the comparison module comprises labeled publications relating to a first set of sentences as a similar training dataset and labeled publications relating to a second set of sentences as a dissimilar training dataset.

Optionally, an unlabeled training dataset for the comparison module comprises a second set of existing publications.

Optionally, the method employs a generator-adversarial network for training the comparison module.

Optionally, the method further comprises:

receiving a user input relating to the similarity scores for each of the one or more sentences in the plurality of documents; and re-training the comparison module based upon the user input in case of misconception Optionally, the multi-dimensional hierarchical space is a hyperbolic space.

DETAILED DESCRIPTION OF THE DRAWINGS

Referring now to the drawings, particularly by their reference numbers, FIG. 1 is a schematic illustration of a network environment 100, wherein a system for comparing a plurality of documents is implemented, in accordance with an embodiment of the present disclosure. The network environment 100 comprises a server arrangement 102 including one or more processors and a lexicon ontology 104. The server arrangement 102 is communicably coupled via one or more data communication networks (depicted as a data communication network 106) with the lexicon ontology 104. Furthermore, the server arrangement 102 comprises a tokenizer module 108, a transmutation module 110 and a comparison module 112.

FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of server arrangements, communication networks and lexicon ontology databanks. A person skilled in the art will recognize many variations, alternatives, and modifications of embodiments of the present disclosure.

Figure 2:
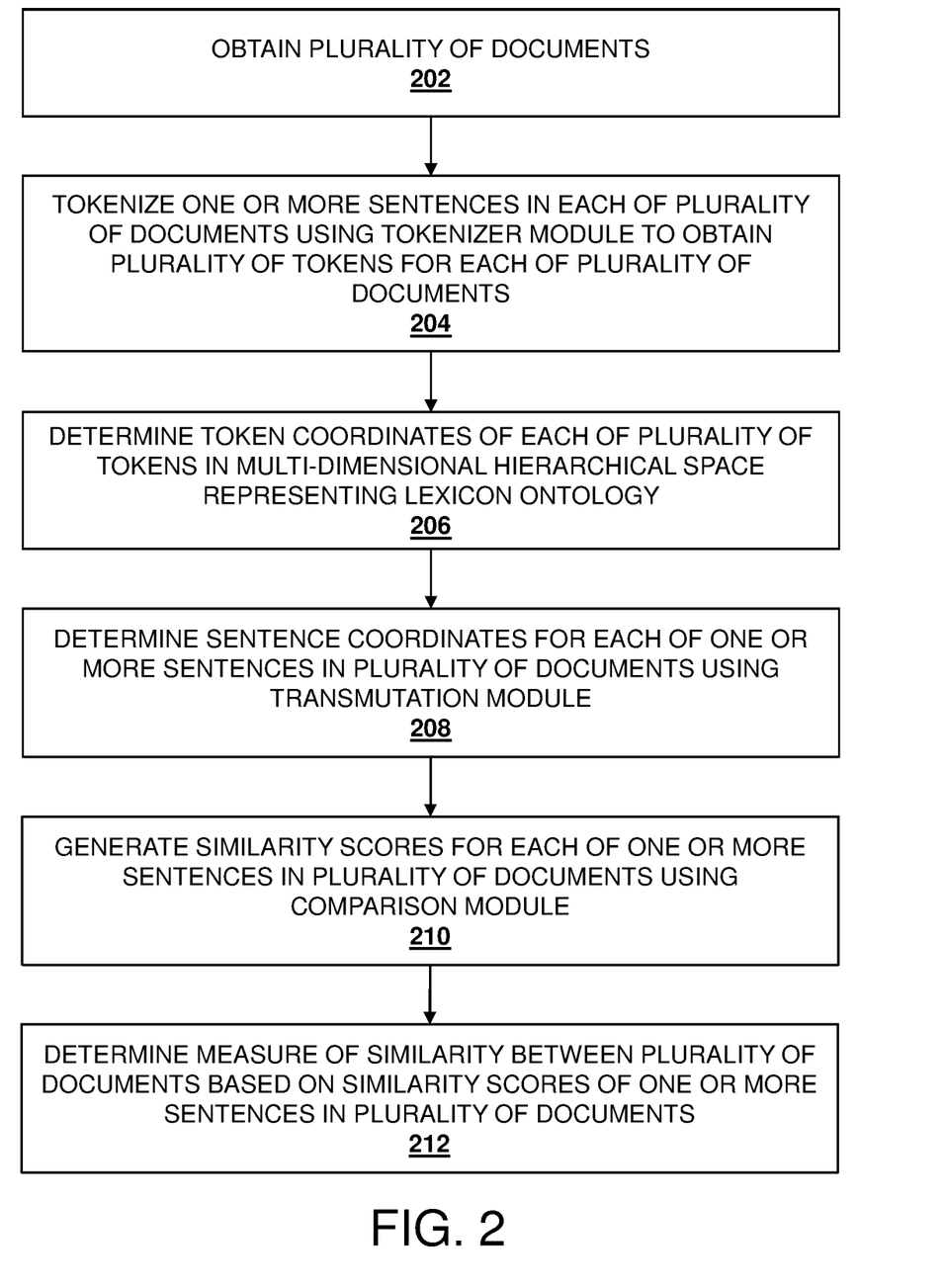
FIG. 2 is a flow chart depicting steps of a method for comparing a plurality of documents, in accordance with an embodiment of the present disclosure.

Referring to FIG. 2, illustrated is a flow chart depicting steps of a method of comparing a plurality of documents, in accordance with an embodiment of the present disclosure. The method is depicted as a collection of steps in a logical flow diagram, which represents a sequence of steps that can be implemented in hardware, software, or a combination thereof, for example as aforementioned.

The method of comparing a plurality of documents, wherein each of the plurality of documents comprise one or more sentences, is implemented via a system comprising a server arrangement including one or more processors, the server arrangement being communicably coupled via one or more data communication networks with a lexicon ontology.

At a step 202, the plurality of documents are obtained.

At a step 204, the one or more sentences in each of the plurality of documents is tokenized using a tokenizer module to obtain a plurality of tokens for each of the plurality of documents.

At a step 206, token coordinates of each of the plurality of tokens is determined in the multi-dimensional hierarchical space representing the lexicon ontology.

At a step 208, sentence coordinates for each of the one or more sentences in the plurality of documents is determined using a transmutation module, wherein sentence coordinates for a given sentence is determined based on token coordinates of tokens in the given sentence and token coordinates of tokens adjacent to the given sentence.

At a step 210, similarity scores for each of the one or more sentences in the plurality of documents is generated using a comparison module, wherein sentence coordinates of a given sentence in a document (in the plurality of documents) is compared with sentence coordinates of one or more sentences of the remaining documents (in the plurality of documents) to generate similarity scores for the given sentence.

At a step 212, a measure of similarity is determined between the plurality of documents based on the similarity scores of the one or more sentences in the plurality of documents.

The steps 202 to 212 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for comparing a plurality of documents, wherein each of the plurality of documents comprise one or more sentences, wherein the system comprises:

a lexicon ontology represented into a multi-dimensional hierarchical space; and
a server arrangement communicably coupled to the lexicon ontology, wherein the server arrangement is configured to:
obtain the plurality of documents;
tokenize the one or more sentences in each of the plurality of documents to obtain a plurality of tokens for each of the plurality of documents;
determine token coordinates of each of the plurality of tokens in the multi-dimensional hierarchical space representing the lexicon ontology, wherein the token coordinates refer to a location of a token in the multi-dimensional hierarchical space, and wherein the location is specified by a set of numbers, letters, symbols, or a combination thereof;
determine sentence coordinates for each of the one or more sentences in the plurality of documents, wherein sentence coordinates for a given sentence are determined based on token coordinates of tokens in the given sentence and token coordinates of tokens neighboring to the given sentence, wherein the sentence coordinates refer to a location of a sentence from amongst the one or more sentences comprised in a document and defined by way of a set of numbers, letters, symbols, or a combination thereof in the multi-dimensional hierarchical space;
generate similarity scores for each of the one or more sentences in the plurality of documents, wherein sentence coordinates of a given sentence in a document in the plurality of documents are compared with sentence coordinates of one or more sentences of remaining documents in the plurality of documents to generate similarity scores for the given sentence; and
determine a measure of similarity between the plurality of documents based on the similarity scores of the one or more sentences in the plurality of documents.

2. The system of claim 1, wherein the server arrangement employs machine learning algorithms.

3. The system of claim 2, wherein the server arrangement, is trained using unsupervised learning techniques.

4. The system of claim 3, wherein an unlabeled training dataset for the server arrangement comprises a first set of existing publications.

5. The system of claim 2, wherein the server arrangement, employing machine learning algorithms, is trained using semi-supervised learning techniques.

6. The system of claim 5, wherein a labeled training dataset for the server arrangement comprises labeled publications relating to a first set of sentences as a similar training dataset and labeled publications relating to a second set of sentences as a dissimilar training dataset.

7. The system of claim 5, wherein an unlabeled training dataset for the server arrangement comprises a second set of existing publications.

8. The system of claim 5, wherein the server arrangement is trained by employing a generator-adversarial network.

9. The system of claim 1, wherein the system is further configured to:
receive a user input relating to the similarity scores for each of the one or more sentences in the plurality of documents; and
re-train the server arrangement based upon the user input in case of misconception.

10. The system of claim 1, wherein the multi-dimensional hierarchical space is a hyperbolic space.

11. A method of comparing a plurality of documents, wherein each of the plurality of documents comprise one or more sentences, wherein the method is implemented via a system comprising a server arrangement communicably coupled to a lexicon ontology, the method comprising:

obtaining the plurality of documents;

tokenizing the one or more sentences in each of the plurality of documents to obtain a plurality of tokens for each of the plurality of documents;

determining token coordinates of each of the plurality of tokens in a multi-dimensional hierarchical space representing the lexicon ontology, wherein the token coordinates refer to a location of a token in the multi-dimensional hierarchical space, and wherein the location is specified by a set of numbers, letters, symbols, or a combination thereof;

determining sentence coordinates for each of the one or more sentences in the plurality of documents, wherein sentence coordinates for a given sentence are determined based on token coordinates of tokens in the given sentence and token coordinates of tokens adjacent to the given sentence, wherein the sentence coordinates refer to a location of a sentence from amongst the one or more sentences comprised in a document and defined by way of a set of numbers, letters, symbols, or a combination thereof in the multi-dimensional hierarchical space;

generating similarity scores for each of the one or more sentences in the plurality of documents, wherein sentence coordinates of a given sentence in a document in the plurality of documents are compared with sentence coordinates of one or more sentences of remaining documents in the plurality of documents to generate similarity scores for the given sentence; and determining a measure of similarity between the plurality of documents based on the similarity scores of the one or more sentences in the plurality of documents.

12. The method of claim 11, wherein the method employs machine learning algorithms to train the server arrangement.

13. The method of claim 12, wherein the method employs machine learning algorithms using unsupervised learning techniques.

14. The method of claim 13, wherein an unlabeled training dataset for the server arrangement comprises a first set of existing publications.

15. The method of claim 12, wherein the method employs training the server arrangement employing machine learning algorithms using semi-supervised learning techniques.

16. The method of claim 15, wherein a labeled training dataset for the server arrangement comprises labeled publications relating to a first set of sentences as a similar training dataset and labeled publications relating to a second set of sentences as a dissimilar training dataset.

17. The method of claim 15, wherein an unlabeled training dataset for the server arrangement comprises a second set of existing publications.

18. The method of claim 15, wherein the method employs a generator-adversarial network for training the server arrangement.

19. The method of claim 11, wherein the method further comprises:

receiving a user input relating to the similarity scores for each of the one or more sentences in the plurality of documents; and re-training the server arrangement based upon the user input in case of misconception.

20. The method of claim 11, wherein the multi-dimensional hierarchical space is a hyperbolic space.

* * * * *